US012169392B2

(12) United States Patent
Nakazawa

(10) Patent No.: US 12,169,392 B2
(45) Date of Patent: Dec. 17, 2024

(54) TIMEPIECE

(71) Applicant: Seiko Epson Corporation, Tokyo (JP)

(72) Inventor: Toshinori Nakazawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 379 days.

(21) Appl. No.: 17/680,462

(22) Filed: Feb. 25, 2022

(65) Prior Publication Data

US 2022/0276613 A1 Sep. 1, 2022

(30) Foreign Application Priority Data

Feb. 26, 2021 (JP) ................................ 2021-029745

(51) Int. Cl.
*G04C 10/04* (2006.01)
*G04B 19/04* (2006.01)

(52) U.S. Cl.
CPC ........... *G04C 10/04* (2013.01); *G04B 19/042* (2013.01)

(58) Field of Classification Search
CPC .... G04C 10/04; G04B 19/042; G04B 19/065; G04B 19/087; G04B 9/00; G04B 19/048; G04B 19/10
See application file for complete search history.

(56) References Cited

U.S. PATENT DOCUMENTS

| | | | | |
|---|---|---|---|---|
| 1,505,521 | A | 8/1924 | Kresser | |
| 3,431,721 | A | 3/1969 | Slaugh | |
| 2019/0196413 | A1 * | 6/2019 | Iijima | G04C 10/04 |
| 2019/0265649 | A1 * | 8/2019 | Nakanishi | G04G 9/0064 |
| 2020/0201257 | A1 * | 6/2020 | Kuroda | G04B 19/12 |

FOREIGN PATENT DOCUMENTS

| | | | |
|---|---|---|---|
| CH | 61740 | A | 10/1913 |
| JP | 2000-292210 | A | 10/2000 |
| JP | 2011-247708 | A | 12/2011 |
| JP | 2012-168200 | A | 9/2012 |
| JP | 2018-040698 | A | 3/2018 |

* cited by examiner

*Primary Examiner* — Edwin A. Leon
(74) *Attorney, Agent, or Firm* — Harness, Dickey & Pierce, P.L.C.

(57) ABSTRACT

A timepiece includes an hour hand and a minute hand, a dial in which a cutout portion is formed, time scales for indicating the time of day disposed at the dial, a plate member disposed at a back side of the dial, and an auxiliary hand member disposed at a position of the plate member corresponding to the cutout portion of the dial in a plan view. The auxiliary hand member functions as another time scale for indicating the time of day and indicates information other than the time of day. The auxiliary hand member as another time scale is located farther away from the plate member than the time scales.

12 Claims, 7 Drawing Sheets

TIMEPIECE

The present application is based on, and claims priority from JP Application Serial Number 2021-029745, filed Feb. 26, 2021, the disclosure of which is hereby incorporated by reference herein in its entirety.

BACKGROUND

1. Technical Field

The present disclosure relates to a timepiece.

2. Related Art

There has been disclosed an electronic timepiece in which, in addition to time display hands for indicating the time of day, a display hand and a scale plate for displaying a duration time until the display of the time of day is stopped are provided.

In an electronic clock disclosed in JP-A-2011-247708, by displaying the time of day using time display hands, and by displaying a duration time using a display hand, both of the time of day and the duration time can be simultaneously checked.

In JP-A-2011-247708, the display hand and a scale plate are provided in an overlapping manner with scales to be indicated by the time display hands. Accordingly, scales for indicating the time of day cannot be partially displayed on a dial so that there has been a drawback that it becomes difficult for a user to read the display of the time of day that the time display hands indicate.

SUMMARY

According to an aspect to the present disclosure, there is provided a timepiece including: an hour hand and a minute hand, a dial on which a cutout portion is formed, a plate member disposed at a back side of the dial, and an auxiliary hand member disposed at a position corresponding to the cutout portion of the dial in plan view as viewed in a direction along an axis of the hour hand and the minute hand, the auxiliary hand member being configured to function as a scale for indicating the time of day, and to indicate information other than the time of day.

DESCRIPTION OF EXEMPLARY EMBODIMENTS

First Embodiment

Hereinafter, a timepiece 1 according to a first embodiment of the present disclosure is described with reference to drawings.

Figure 1:
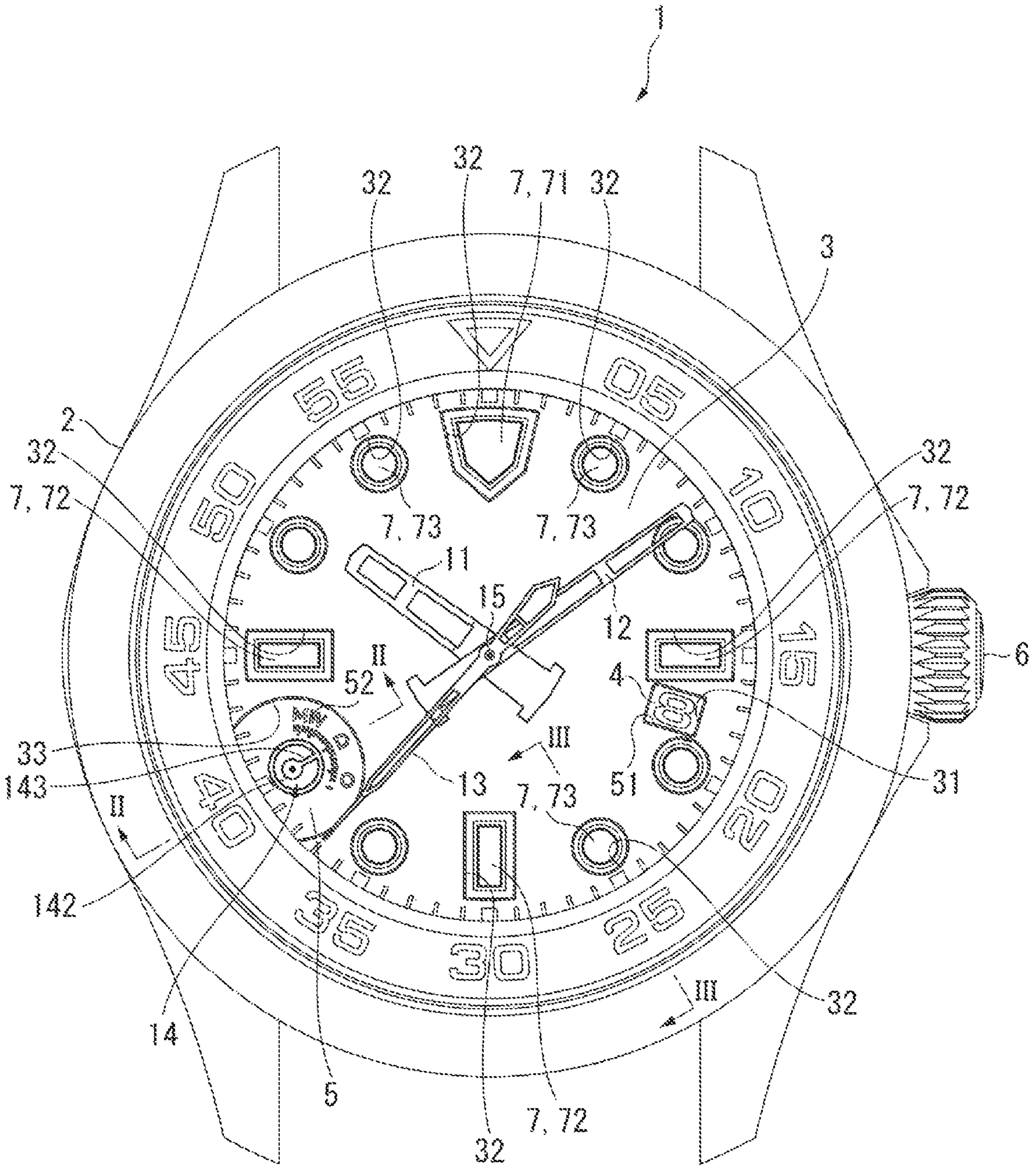
FIG. 1 is a front view illustrating a schematic configuration of a timepiece according to a first embodiment of the present disclosure.

FIG. 1 is a front view illustrating the timepiece 1 according to the present embodiment.

As illustrated in FIG. 1, the timepiece 1 is a watch that a user wears on his/her wrist. In the present embodiment, the timepiece 1 includes an outer case 2, a dial 3, a date indicator 4, a plate member 5, a crown 6, time scales 7, an hour hand 11 as a pointer, a minute hand 12 as a pointer, and a seconds hand 13 as a pointer, an auxiliary hand member 14, a pointer shaft 15, and a movement not illustrated in the drawing.

The hour hand 11, the minute hand 12, and the seconds hand 13 are center hands in each of where the pointer shaft 15 is disposed at a center position of a planar surface of the dial 3. Here, the pointer shaft 15 is an example of a shaft for the hour hand 11 and the minute hand 12 of the present disclosure.

Dial

The dial 3 is a circular plate shaped member, and a small window 31 is formed in the dial 3. In the present embodiment, the date indicator 4 can be visually recognized through the small window 31 and a window portion 51 described later. Further, the dial 3 has openings 32 at portions respectively corresponding to a one o'clock position, a two o'clock position, a three o'clock position, a four o'clock position, a five o'clock position, a six o'clock position, a seven o'clock position, a nine o'clock position, a ten o'clock position, an eleven o'clock position, and a twelve o'clock position. That is, the opening 32 is formed in the dial 3 at positions indicating hours other than a position indicating eight o'clock.

In the present embodiment, in the dial 3, a cutout portion 33 having an approximately semicircular shape is formed in a direction of eight o'clock with respect to the center of the dial 3. Further, in plan view as viewed from an axial direction of the pointer shaft 15, the auxiliary hand member 14 is disposed at a position corresponding to the cutout portion 33 of the dial 3.

Plate Member

The plate member 5 is a disk-shaped member, and is disposed on a back side of the dial 3. In the present embodiment, in the plate member 5, the window portion 51 is formed at a position corresponding to the above-described small window 31. With such a configuration, the date indicator 4 can be visually recognized through the small window 31 and the window portion 51. That is, in the present embodiment, the date indicator 4, the plate member 5, and the dial 3 are arranged in this order in the axial direction of the pointer shaft 15.

Further, in plan view as viewed from the axial direction of the pointer shaft 15, the plate member 5 is provided with an information scale 52 at a position corresponding to the cutout portion 33. In the present embodiment, the information scale 52 is configured to display a battery residual amount of the timepiece 1 by being indicated by the auxiliary hand member 14. Here, the battery residual amount is an example of information in the present disclosure other than the time of day.

Auxiliary Hand Member 14

Figure 2:
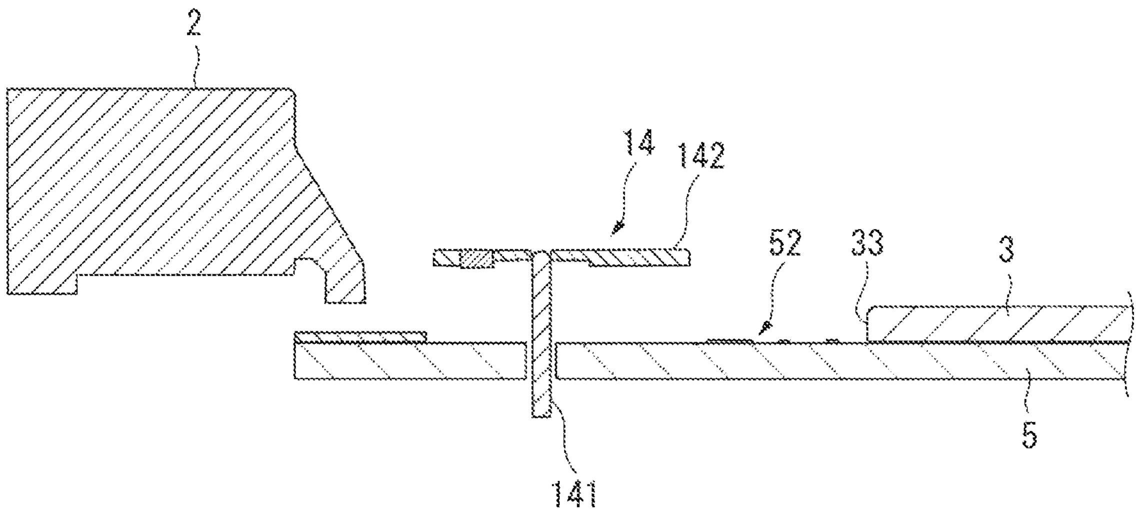
FIG. 2 is an enlarged cross-sectional view illustrating a schematic configuration of a main portion of the timepiece according to the first embodiment.

FIG. 2 is an enlarged cross-sectional view illustrating a schematic configuration of a main portion of the time piece 1. FIG. 2 is an enlarged cross-sectional view taken along a line II-II in FIG. 1.

As illustrated in FIG. 1 and FIG. 2, the auxiliary hand member 14 is disposed on the plate member 5 at a position corresponding to the cutout portion 33. Specifically, the auxiliary hand member 14 is disposed at the eight o'clock position. With such a configuration, the auxiliary hand member 14 displays the time of day by being indicated by the hour hand 11, the minute hand 12, and the seconds hand 13. That is, the auxiliary hand member 14 functions as a part of the time scales 7 for indicating the time of day.

In the present embodiment, the auxiliary hand member 14 includes a shaft member 141 and a display member 142.

The shaft member 141 is a rod-shaped member, and a proximal end side of the shaft member 141 is mounted on a movement not illustrated in the drawing, and the display member 142 is mounted on a distal end side of the shaft member 141. With such a configuration, when the shaft member 141 is rotated by the movement, the display member 142 is also rotated. Here, the shaft member 141 is an example of a rotary shaft of the present disclosure.

The display member 142 is a disk-shaped member, and is provided with an indication mark 143 having a linear shape on a surface thereof.. Accordingly, the auxiliary hand member 14 is configured to indicate the battery residual amount of the timepiece 1 by indicating the information scale 52 by the indication mark 143. Here, in the present embodiment, a surface of the display member 142 is coated with a fluorescent coating material.

Here, in the present embodiment, in plan view as viewed in the axial direction of the pointer shaft 15, the shaft member 141 is disposed at a position different from the center position of the display member 142. Further, in the display member 142, a proximal end portion of the indication mark 143 is located at a position where the display member 142 is mounted on the shaft portion 141. With such a configuration, compared to a case where the shaft member 141 is mounted on the display member 142 at the center position of the display member 142, a swing amount of the indication mark 143 corresponding to the rotation of the display member 142 is increased. Accordingly, the visibility of the indication of the indication mark 143 by the information scale 52 can be enhanced.

Time Scale

Figure 3:
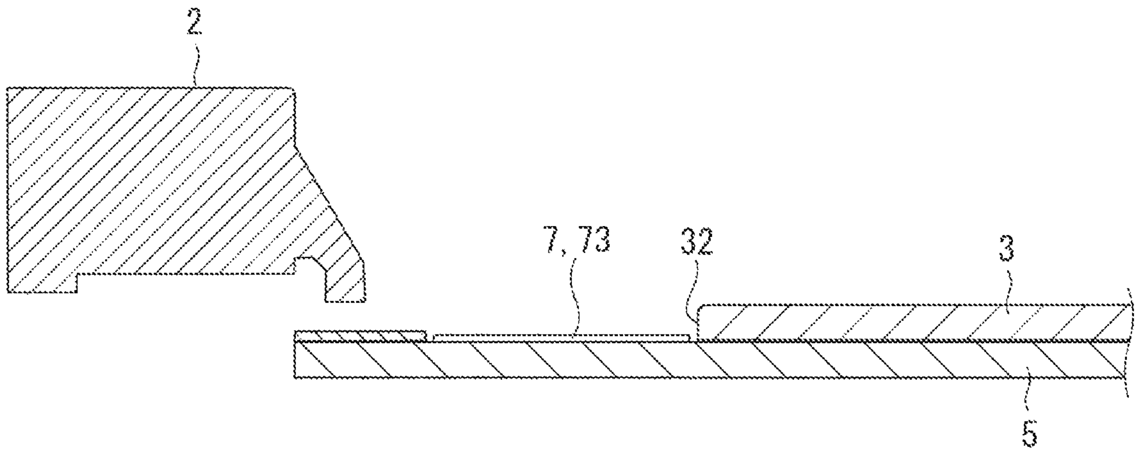
FIG. 3 is an enlarged cross-sectional view illustrating a schematic configuration of the timepiece according to the first embodiment.

FIG. 3 is an enlarged cross-sectional view illustrating a schematic configuration of the timepiece 1. FIG. 3 is a cross-sectional view taken along a line III-III in FIG. 1.

As illustrated in FIG. 1 and FIG. 3, the plate member 5 has a plurality of the time scales 7 for displaying the time of day by being indicated by the hour hand 11, the minute hand 12, and the seconds hand 13, at positions respectively corresponding to the openings 32. In the present embodiment, the time scales 7 are provided on the plate member 5 disposed on the back side of the dial 3 and hence, processing and decoration of the dial 3 can be easily performed.

Further, in the present embodiment, in plan view as viewed in the axial direction of the pointer shaft 15, a first time scale 71 disposed at the twelve o'clock position is formed in a pentagonal shape, and second time scales 72 respectively disposed at the three o'clock position, the six o'clock position, and the nine o'clock position are respectively formed in a rectangular shape. With such a configuration, the visibility of the time scales 71, 72 disposed on a so-called cross line is enhanced. Further, third time scales 73 respectively disposed at the one o'clock position, the two o'clock position, the four o'clock position, the five o'clock position, the seven o'clock position, the ten o'clock position, and the eleven o'clock position are formed in a circular shape. That is, in the present embodiment, in plan view as viewed in the axial direction of the pointer shaft 15, the third time scales 73 respectively disposed at the one o'clock position, the two o'clock position, the four o'clock position, the five o'clock position, the seven o'clock position, the ten o'clock position, and the eleven o'clock position and the display member 142 of the auxiliary hand member 14 are formed in the same shape. With such a configuration, the timepiece 1 exhibits the uniformity with respect to the time scales 7.

Further, in the present embodiment, surfaces of the time scales 7 are coated with a fluorescent coating material in the same manner as the above-described display member 142. With such a configuration, the visibility when a user checks the time of day by the timepiece 1 in a dark place, such as underwater can be enhanced.

Manner of operation and advantageous effect of first embodiment

According to the present embodiment, the following advantageous effects can be obtained.

In the present embodiment, the auxiliary hand member 14 displays the battery residual amount that is information other than the time of day and, at the same time, displays the time of day by being indicated by the hour hand 11, the minute hand 12, and the seconds hand 13. Accordingly, the auxiliary hand member 14 indicating the battery residual amount can be provided without eliminating the scale for indicating the time of day.

Accordingly, reading of a display of the time of day by the hour hand 11, the minute hand 12, and the seconds hand 13 can be facilitated, and the battery residual amount that is information other than the time of day can be displayed.

In the present embodiment, the time scales 7 for displaying the time of day are disposed on the plate member 5 disposed on the back side of the dial 3 and hence, processing and decoration of the dial 3 can be easily performed.

In the present embodiment, the auxiliary hand member 14 and the time scales 7 are coated with a fluorescent coating material. With such a configuration, for example, the visibility when a user checks the time of day by the timepiece 1 in a dark place, such as underwater can be enhanced.

In the present embodiment, in plan view as viewed in the direction along the pointer shaft 15, the auxiliary hand member 14 has the same shape as the third time scales 73 and hence, it is possible to produce the uniformity of the time scales 7.

In the present embodiment, the plate member 5 on which the auxiliary hand member 14 is disposed is provided with the information scales 52 and hence, positional alignment between the auxiliary hand member 14 and the information scales 52 can be easily performed. Accordingly, assembling of the timepiece 1 can be facilitated.

In the present embodiment, the auxiliary hand member 14 is provided with the indication mark 143 for indicating the information scales 52. With such a configuration, even when a hand member is not mounted on the auxiliary hand member 14, the battery residual amount can be indicated by the auxiliary hand member 14. Accordingly, the number of parts of the timepiece 1 can be reduced.

In the present embodiment, in plan view as viewed in the direction along the pointer shaft 15, a position of the shaft member 141 of the auxiliary hand member 14 differs from the center position of the auxiliary hand member 14. With such a configuration, the swing width of the indication by the auxiliary hand member 14 can be increased with respect to the rotation of the auxiliary hand member 14. Accordingly, the visibility of the indication of the battery residual amount by auxiliary hand member 14 can be enhanced.

In the present embodiment, the auxiliary hand member 14 is configured to indicate the battery residual amount. With such a configuration, the user can check the battery residual amount of the timepiece 1.

Second Embodiment

Next, a timepiece 1A according to a second embodiment of the present disclosure is described with reference to drawings.

The timepiece 1A according to the second embodiment differs from the timepiece 1 according to the first embodiment with respect to a point that time scales 7A are disposed on a dial 3A. Here, in the second embodiment, components identical or similar to the corresponding components of the first embodiment are given the same symbols, and the repeated description of these components is omitted.

Figure 4:
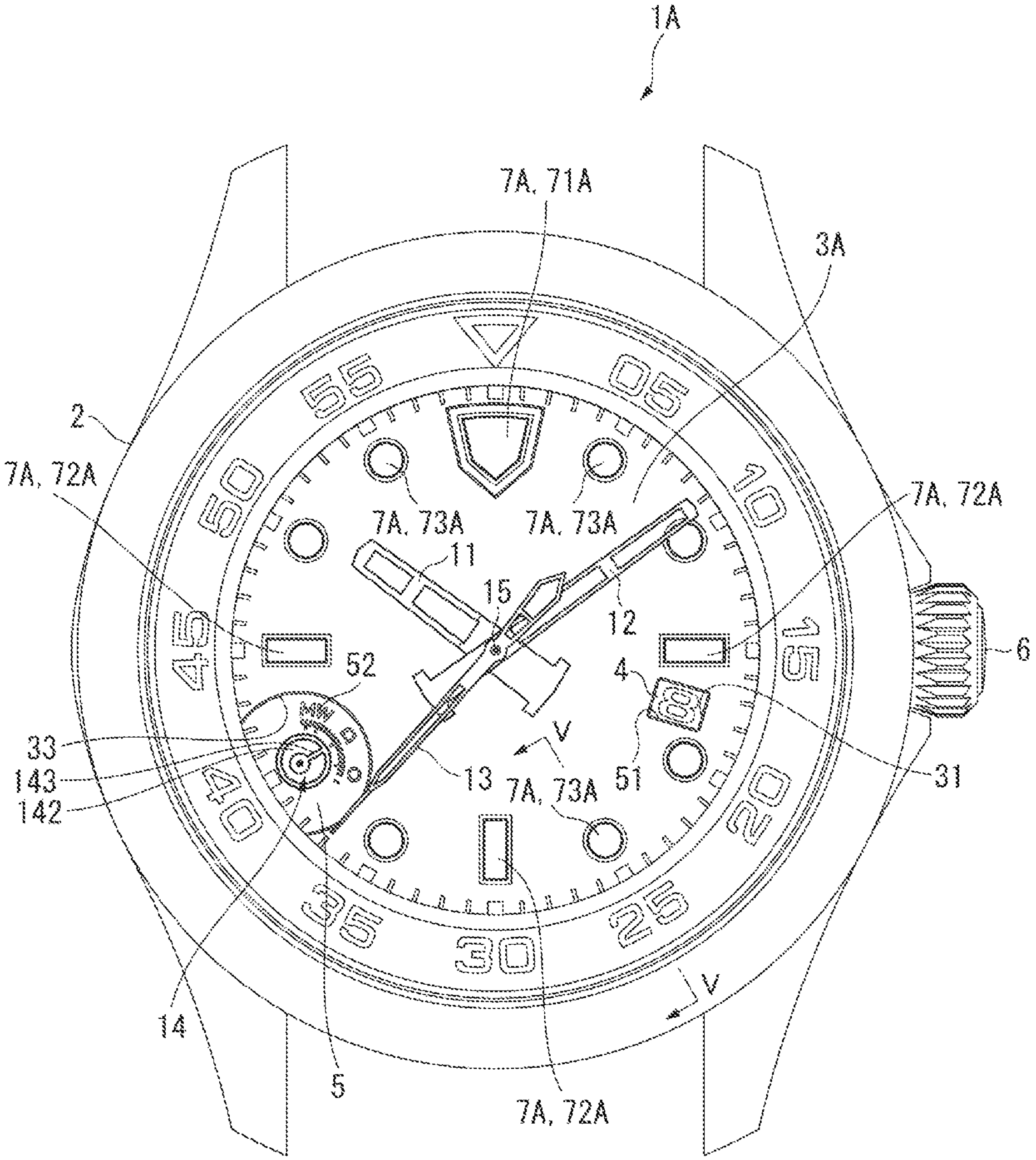
FIG. 4 is a front view illustrating a schematic configuration of a timepiece according to a second embodiment.
Figure 5:
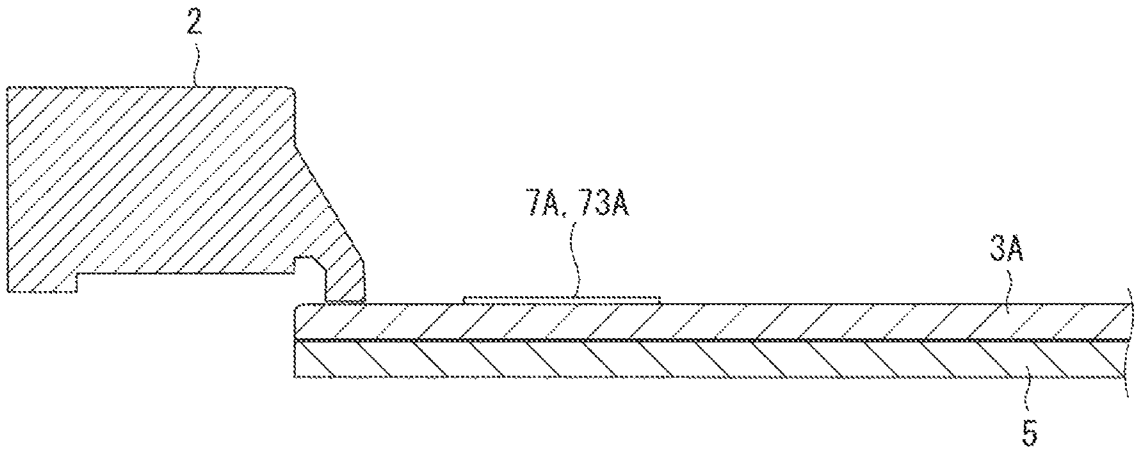
FIG. 5 is an enlarged cross-sectional view illustrating a schematic configuration of the timepiece according to the second embodiment.

FIG. 4 is a front view illustrating the timepiece 1A according to the second embodiment, and FIG. 5 is an enlarged cross-sectional view illustrating a schematic configuration of the timepiece 1A. Here, FIG. 5 is a cross-sectional view taken along a line V-V in FIG. 4.

As illustrated in FIG. 4 and FIG. 5, in the present embodiment, the timepiece 1A includes an outer case 2, the dial 3A, a date indicator 4, a plate member 5, a crown 6, the time scales 7A, an hour hand 11 as a pointer, a minute hand 12 as a pointer, and a seconds hand 13 as a pointer, an auxiliary hand member 14, a pointer shaft 15, and a movement not illustrated in the drawing.

Further, in the present embodiment, the dial 3A has the time scales 7A at a one o'clock position, a two o'clock position, a three o'clock position, a four o'clock position, a five o'clock position, a six o'clock position, a seven o'clock position, a nine o'clock position, a ten o'clock position, an eleven o'clock position, and a twelve o'clock position.

In the present embodiment, the time scales 7A are disposed on the dial 3A as described above and hence, openings for visually recognizing the time scales 7A are not formed in the dial 3A.

Further, in the same manner as the first embodiment described above, in the present embodiment, in plan view as viewed in an axial direction of the pointer shaft 15, a first time scale 71A disposed at the twelve o'clock position is formed in a pentagonal shape, and second time scales 72A respectively disposed at the three o'clock position, the six o'clock position, and the nine o'clock position are respectively formed in a rectangular shape. Further, third time scales 73A respectively disposed at the one o'clock position, the two o'clock position, the four o'clock position, the five o'clock position, the seven o'clock position, the ten o'clock position, and the eleven o'clock position are formed in a circular shape.

That is, in plan view as viewed in the axial direction of the pointer shaft 15, the third time scales 73 respectively disposed at the one o'clock position, the two o'clock position, the four o'clock position, the five o'clock position, the seven o'clock position, the ten o'clock position, and the eleven o'clock position and a display member 142 of the auxiliary hand member 14 are formed in the same shape.

Manner of Operation and Advantageous Effect of Second Embodiment

According to the present embodiment, the following advantageous effects can be obtained.

In the present embodiment, a plurality of the time scales 7A for displaying the time of day by being indicated by the hour hand 11, the minute hand 12, and the seconds hand 13 are disposed in the dial 3A. With such a configuration, for example, unlike a case in which the time scales are disposed on the plate member disposed on the back side of the dial, it is not necessary to perform alignment between positions of the openings formed in the dial and positions of the time scales disposed on the plate member. Accordingly, the assembling of the timepiece 1A can be facilitated.

Third Embodiment

Next, a timepiece 1B according to a third embodiment of the present disclosure is described with reference to drawings.

The timepiece 1B according to the third embodiment differs from the timepieces 1, 1A according to the first and second embodiments described above with respect to a point that an auxiliary hand member 14B includes an auxiliary hand 144B and a scale member 145B. Here, in the third embodiment, components identical or similar to the corresponding components of the first and second embodiments are given the same symbols, and the repeated description of these components is omitted.

Figure 6:
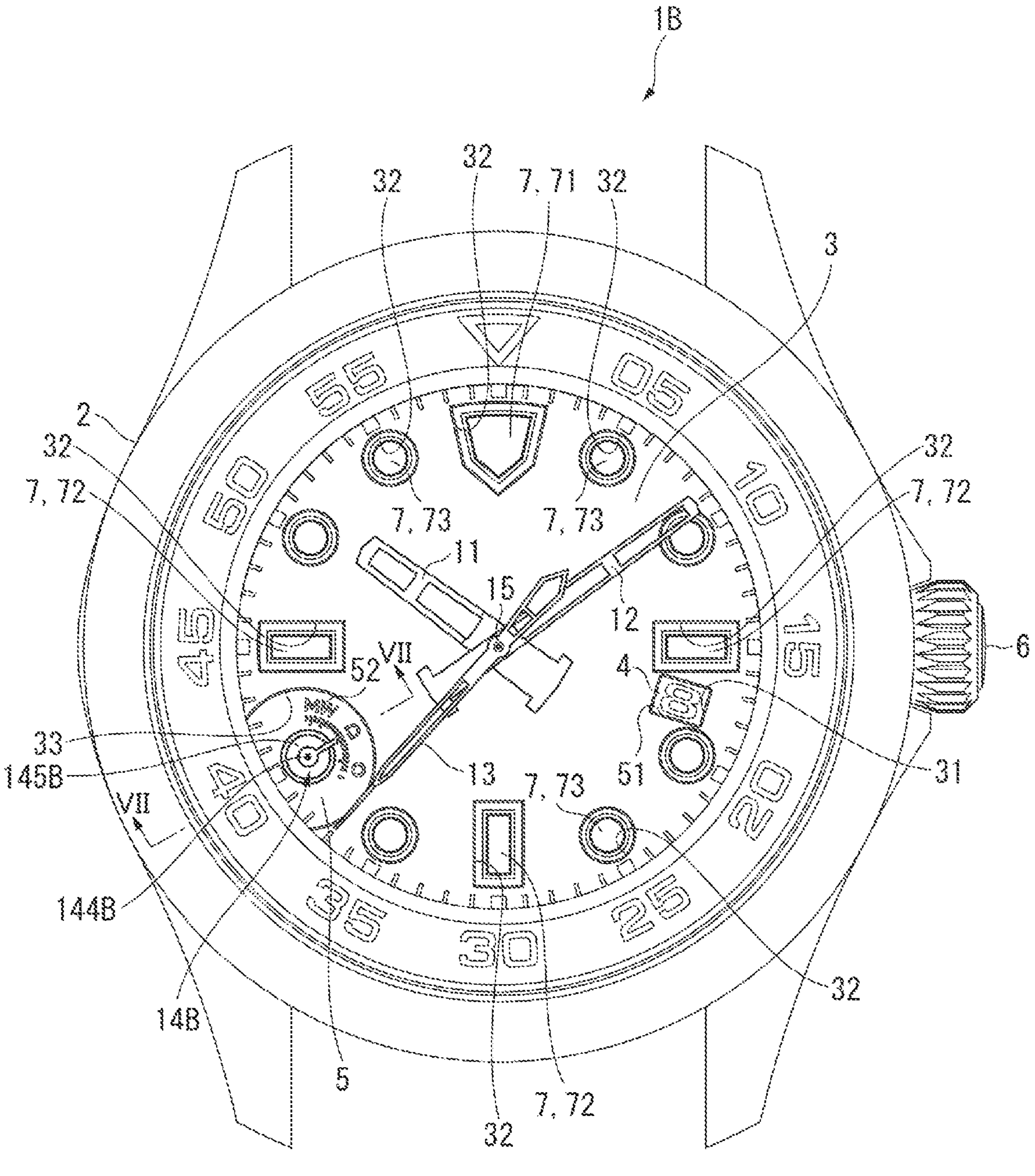
FIG. 6 is a front view illustrating a schematic configuration of a timepiece according to a third embodiment.
Figure 7:
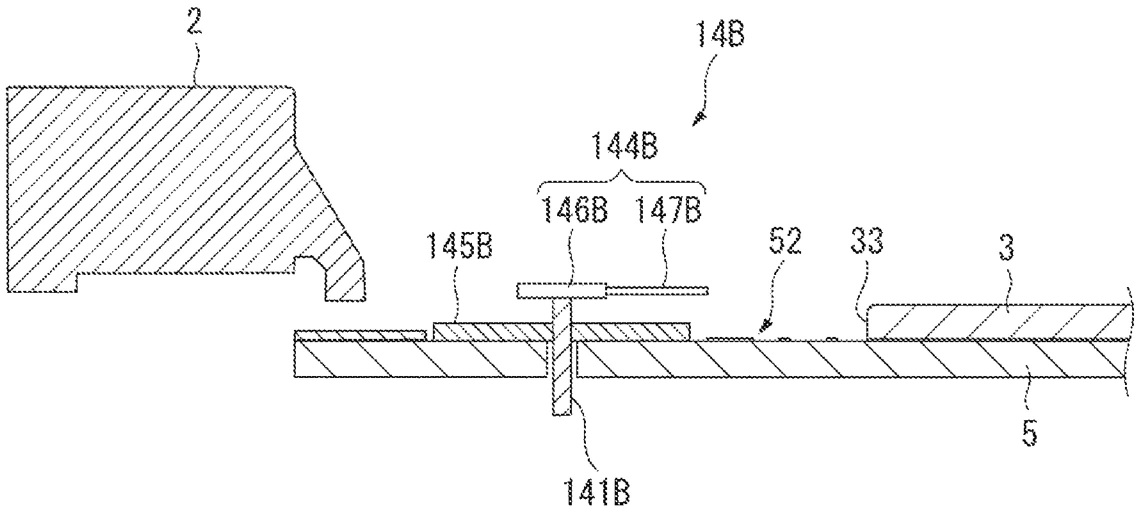
FIG. 7 is an enlarged cross-sectional view illustrating a schematic configuration of a main portion of the timepiece according to the third embodiment.

FIG. 6 is front view illustrating the timepiece 1B according to the third embodiment, and FIG. 7 is an enlarged cross-sectional view illustrating a schematic configuration of a main portion of the timepiece 1B. Here, FIG. 7 is a cross-sectional view taken along a line VII-VII in FIG. 6.

As illustrated in FIG. 6 and FIG. 7, in the present embodiment, the timepiece 1B includes an outer case 2, a dial 3 having a disc shape, a date indicator 4, a plate member 5, a crown 6, time scales 7, an hour hand 11 as a pointer, a minute hand 12 as a pointer, and a seconds hand 13 as a pointer, the auxiliary hand member 14B, a pointer shaft 15, and a movement not illustrated in the drawing.

Auxiliary Hand Member

In the same manner as the first and second embodiments described above, the auxiliary hand member 14B is disposed at a position corresponding to a cutout portion 33 of the dial 3. Specifically, the auxiliary hand member 14B is disposed at an eight o'clock position. With such a configuration, the auxiliary hand member 14 displays the time of day by being indicated by the hour hand 11, the minute hand 12, and the seconds hand 13. That is, the auxiliary hand member 14B functions as a part of the time scales 7 for indicating the time of day.

In the present embodiment, the auxiliary hand member 14B includes a shaft member 141B, the auxiliary hand 144B, and the scale member 145B.

The shaft member 141B is a rod-shaped member, and a proximal end side of the shaft member 141B is mounted on a movement not illustrated in the drawing, and the auxiliary hand 144B is mounted on a distal end side of the shaft member 141B. With such a configuration, when the shaft member 141B is rotated by the movement, the auxiliary hand 144B is also rotated.

Further, in the present embodiment, the shaft member 141B penetrates the scale member 145B.

The auxiliary hand 144B includes a disc portion 146B and a hand portion 147B, and is mounted on a distal end portion of the shaft member 141B. Further, the auxiliary hand 144B is configured to indicate information scales 52 by the hand portion 147B.

In the present embodiment, the hand portion 147B is formed such that a distal end portion of the hand portion 147B is positioned outside an outer periphery of the scale member 145B, in plan view as viewed in an axial direction of the pointer shaft 15. With such a configuration, the distal end portion of the hand portion 147B can be positioned closer to the information scales 52 and hence, the visibility of the indication of the information scale 52 by the hand portion 147B can be enhanced.

The scale member 145B has a disc shape, and is disposed on the plate member 5. In the present embodiment, the scale member 145B is configured to display the time of day by being indicated by the hour hand 11, the minute hand 12, and the seconds hand 13. That is, in the present embodiment, the scale member 145B is configured as a part of the time scales 7.

Further, in the present embodiment, the scale member 145B has the same shape as the third time scales 73, in plan view as viewed in the axial direction of the pointer shaft 15. With such a configuration, in the same manner as the first and second embodiments described above, it is possible to produce the uniformity of the time scales 7.

Further, in the present embodiment, in the same manner as the first and second embodiments described above, a surface of the scale member 145B is coated with a fluorescent coating material.

Manner of operation and advantageous effect of third embodiment.

According to the present embodiment, the following advantageous effects can be obtained.

In the present embodiment, the auxiliary hand member 14B includes the auxiliary hand 144B for indicating the information scales 52, and the scale member 145B for displaying the time of day and hence, the degree of freedom in design of the auxiliary hand 144B can be increased. Accordingly, for example, by forming the auxiliary hand 144B such that the distal end portion of the hand portion 147B of the auxiliary hand 144B is positioned outside the outer periphery of the scale member 145B, in plan view as viewed in an axial direction of the pointer shaft 15, the visibility of the indication of the information scales 52 by the auxiliary hand 144B can be enhanced.

Modification

Here, the present disclosure is not limited to the above-described embodiments, and modifications, improvements, and the like are also included in the present disclosure within the scope in which the object of the present disclosure can be achieved.

In the respective embodiments described above, in the dial 3, 3A, the cutout portion 33 is formed in the direction of eight o'clock with respect to the center of the dial 3, 3A. However, the present disclosure is not limited to such a configuration. For example, the cutout portion may be formed in a direction of five o'clock with respect to the center of the dial, and the position of the cutout portion in the dial can be set arbitrarily.

In the respective embodiments described above, the time scales 7 include the first time scale 71, 71A having the pentagonal shape, the second time scales 72, 72A having the rectangular shape, and the third time scales 73, 73A having the circular shape. However, the present disclosure is not limited to such a configuration. For example, all of the plurality of time scales may have the same shape, and the shape of the time scales can be set arbitrarily.

In the respective embodiments described above, the plate member 5 is provided with the information scales 52. However, the present disclosure is not limited to such a configuration. For example, the dial may be provided with the information scales indicated by the auxiliary hand member.

In the respective embodiments described above, the auxiliary hand member 14, 14B is configured to indicate the battery residual amount as information other than the time of day. However, the present disclosure is not limited to such a configuration. For example, the auxiliary hand member may be configured as a so-called functional hand for indicating the duration time of a power source of a timepiece, such as a battery or a mainspring, the day of the week information, information related to reception of satellite signals, and the like.

In the respective embodiments described above, the surfaces of the time scales 7, 7A and the surface of the auxiliary hand member 14, 14B are coated with the fluorescent coating material. However, the present disclosure is not limited to such a configuration. For example, a case where the time scales and the auxiliary hand member are not coated with the fluorescent coating material is also included in the present disclosure.

In the first and second embodiments, in plan view as viewed in the direction along the pointer shaft 15, the position of the shaft member 141 of the auxiliary hand member 14 differs from the center position of the auxiliary hand member 14. However, the present disclosure is not limited to such a configuration. For example, a case where the shaft member is mounted on the center position of the auxiliary hand member is also included in the present disclosure.

In the respective embodiments described above, the cutout portion 33 having an approximately semicircular shape is formed. However, the shape of the cutout portion 33 is not limited to the approximately semicircular shape. For example, the shape of the cutout portion may be a circular shape or a rectangular shape. Further, the shape of the cutout portion may have a shape similar to a shape of the third time scale.

In the respective embodiments described above, the cutout portion 33 having an approximately semicircular shape is formed, and the third time scales 73 and the information scales 52 disposed on the plate member 5 are exposed. However, the present disclosure is not limited to such a configuration. For example, the cutout portion may not be formed in the dial. In this case, the third time scale at the eight o'clock position is disposed on a plate member in the same manner as other time scales, and a dial includes a plurality of openings corresponding to the time scales and an information scale. Further, the third time scale at the eight o'clock position and the dial may have a through hole through which a shaft member penetrates. Here, the mode of the information scales disposed on the dial may be substantially equal to the mode of the information scales in the respective embodiments described above. With such a configuration, the uniformity of the time scales is further enhanced, and the design property of the timepiece can be enhanced.

In the respective embodiments described above, the timepiece 1, 1A, 1B includes the hour hand 11, the minute hand 12, and the seconds hand 13 displaying the time of day by indicating the time scales 7, 7A. For example, the timepiece may be a timepiece having no seconds hand.

Summary of Present Disclosure

A timepiece according to the present disclosure includes: an hour hand and a minute hand, a dial on which a cutout portion is formed, a plate member disposed on a back side of the dial, and an auxiliary hand member disposed at a position corresponding to the cutout portion of the dial in plan view as viewed in a direction along an axis of the hour hand and the minute hand, the auxiliary hand member being configured to function as a scale for indicating the time of day, and to indicate information other than the time of day.

With such a configuration, the auxiliary hand member indicates information other than the time of day, and displays the time of day by being indicated by the hour hand and the minute hand. Accordingly, the auxiliary hand member for indicating the information other than the time of day can be provided without eliminating the scales for indicating the time of day. Accordingly, reading of a display of the time of day by the hour hand and the minute hand can be facilitated, and the information other than the time of day can be displayed.

In the timepiece of the present disclosure, the plate member may include a plurality of time scales for displaying the time of day by being indicated by the hour hand and the minute hand, and the dial may have an opening at positions corresponding to the time scales.

With such a configuration, the time scales for displaying the time of day are disposed on the plate member disposed on the back side of the dial and hence, processing and decoration of the dial can be easily performed.

In the timepiece of the present disclosure, the dial may include a plurality of time scales for displaying the time of day by being indicated by the hour hand and the minute hand.

With such a configuration, for example, unlike a case in which the time scales are disposed on the plate member disposed on the back side of the dial, it is not necessary to perform alignment between positions of the openings formed in the dial and positions of the time scales disposed on the plate member. Accordingly, the assembling of the timepiece can be facilitated.

In the timepiece of the present disclosure, the auxiliary hand member and the time scales may be coated with a fluorescent coating material.

With such a configuration, for example, the visibility when a user checks the time of day by the timepiece in a dark place, such as underwater can be enhanced.

In the timepiece of the present disclosure, as viewed in the plan view, the auxiliary hand member may have the same shape as at least one of the plurality of time scales.

With such a configuration, at least one of the time scales and the auxiliary hand member displaying the time of day have the same shape and hence, it is possible to produce the uniformity of the time scales.

In the timepiece of the present disclosure, the plate member may be provided with an information scale indicated by the auxiliary hand member.

With such a configuration, the plate member on which the auxiliary hand member is disposed is provided with the information scale and hence, the positional alignment between the auxiliary hand member and the information scale can be easily performed. Accordingly, assembling of the timepiece can be facilitated.

In the timepiece of the present disclosure, the auxiliary hand member may be provided with an indication mark indicating the information.

With such a configuration, even when the hand member is not mounted on the auxiliary hand member, the information other than the time of day can be indicated by the auxiliary hand member. Accordingly, the number of parts of the timepiece can be reduced.

In the timepiece of the present disclosure, as viewed in the plan view, a position of a rotation axis of the auxiliary hand member may be different from the center position of the auxiliary hand member.

With such a configuration, the swing width of the indication by the auxiliary hand member can be increased with respect to the rotation of the auxiliary hand member. Accordingly, the visibility of the indication of the information by auxiliary hand member can be enhanced.

In the timepiece of the present disclosure, the auxiliary hand member may include an auxiliary hand for indicating the information, and a scale member for displaying the time of day by being indicated by the hour hand and the minute hand.

With such a configuration, the auxiliary hand member includes the auxiliary hand for indicating the information, and the scale member for displaying the time of day and hence, the degree of freedom in design of the auxiliary hand can be increased.

In the timepiece of the present disclosure, the auxiliary hand member may be configured to indicate a battery residual amount as the information.

With such a configuration, the user can check the battery residual amount of the timepiece.

What is claimed is:

1. A timepiece comprising:
- an hour hand and a minute hand;
- a dial in which a cutout portion is formed;
- a plate member disposed at a back side of the dial, the plate member being disposed at a position corresponding to the cutout portion of the dial in a plan view as viewed in a direction along an axis of the hour hand and the minute hand;
- time scales for indicating the time of day disposed at the dial or the plate member; and
- an auxiliary hand member disposed at a position of the plate member corresponding to the cutout portion of the dial as viewed in the plan view, and the auxiliary hand member is configured to:
  - function as another time scale for indicating the time of day; and
  - indicate information other than the time of day,
- wherein the auxiliary hand member as the another time scale is located farther away from the dial than the time scales.

2. The timepiece according to claim 1, wherein
- the plate member includes the time scales for indicating the time of day by being indicated by the hour hand and the minute hand, and
- the dial has a plurality of openings at positions corresponding to the time scales.

3. The timepiece according to claim 2, wherein
- the auxiliary hand member and the time scales are coated with a fluorescent coating material.

4. The timepiece according to claim 2, wherein
- as viewed in the plan view, the auxiliary hand member has a same shape as at least one of the time scales.

5. The timepiece according to claim 1, wherein
- the dial includes the time scales for indicating the time of day by being indicated by the hour hand and the minute hand.

6. The timepiece according to claim 5, wherein
- the auxiliary hand member and the time scales are coated with a fluorescent coating material.

7. The timepiece according to claim 5, wherein
- as viewed in the plan view, the auxiliary hand member has a same shape as at least one of the time scales.

8. The timepiece according to claim 1, wherein the plate member is provided with an information scale indicated by the auxiliary hand member.

9. The timepiece according to claim 1, wherein the auxiliary hand member is provided with an indication mark indicating the information.

10. The timepiece according to claim 1, wherein as viewed in the plan view, a position of a rotation axis of the auxiliary hand member is different from a center position of the auxiliary hand member.

11. The timepiece according to claim 1, wherein the auxiliary hand member includes an auxiliary hand for indicating the information, and the another time scale for indicating the time of day by being indicated by the hour hand and the minute hand.

12. The timepiece according to claim 1, wherein the auxiliary hand member is configured to indicate a battery residual amount as the information.

* * * * *